US010122730B2

(12) United States Patent
Tatham et al.

(10) Patent No.: US 10,122,730 B2
(45) Date of Patent: Nov. 6, 2018

(54) ENABLER FOR EDITING A PREVIOUSLY RATIFIED TRANSMISSION (71) Applicant: Bank of America Corporation, Charlotte, NC (US)

(72) Inventors: Anne D. Tatham, Charlotte, NC (US); Joshua Barnhardt, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 290 days.

(21) Appl. No.: 15/131,147

(22) Filed: Apr. 18, 2016

(65) Prior Publication Data
US 2017/0302675 A1 Oct. 19, 2017

(51) Int. Cl.
*H04L 29/06* (2006.01)
*H04W 12/08* (2009.01)

(52) U.S. Cl.
CPC .......... *H04L 63/102* (2013.01); *H04L 63/126* (2013.01); *H04W 12/08* (2013.01)

(58) Field of Classification Search
None
See application file for complete search history.

(56) References Cited

U.S. PATENT DOCUMENTS

| 5,978,485 | A | 11/1999 | Rosen | |
|---|---|---|---|---|
| 6,850,917 | B1 * | 2/2005 | Hom | G06Q 20/206 705/18 |
| 7,437,523 | B1 * | 10/2008 | Ting | G06F 17/30067 711/161 |
| 8,244,634 | B2 | 8/2012 | McElroy et al. | |
| 8,317,090 | B2 | 11/2012 | Wiesman et al. | |
| 8,560,041 | B2 | 10/2013 | Flaherty et al. | |
| 8,567,669 | B2 | 10/2013 | Griegel et al. | |
| 8,818,893 | B2 | 8/2014 | Weinstein et al. | |
| 2001/0014036 | A1 * | 8/2001 | Rapp | G11C 16/22 365/185.04 |
| 2005/0149335 | A1 | 7/2005 | Mesbah et al. | |
| 2008/0195750 | A1 * | 8/2008 | Sadovsky | G06F 21/78 709/234 |
| 2010/0287098 | A1 | 11/2010 | Quek et al. | |
| 2011/0266414 | A1 | 11/2011 | Ueno et al. | |

* cited by examiner

*Primary Examiner* — Joseph P Hirl
*Assistant Examiner* — Hassan Saadoun
(74) *Attorney, Agent, or Firm* — Weiss & Arons LLP; Michael A. Springs, Esq.

(57) ABSTRACT

Methods for editing a previously approved transmission are provided. Methods may include allocating a portion of memory on a first platform. The allocating may include allocating a details sub-portion for transmission details and allocating an approvals sub-portion for approval details. The method may include writing the transmission details into the details sub-portion. Methods may include writing a plurality of approver identifications into the approval sub-portion. Methods may include transmitting the computer-readable packet to a first approver email address. Methods may include enabling a first approver, associated with the first approver email address, to set an approval bit to one. Methods may include locking the details sub-portion and the approvals sub-portion when the first approver sets the approval bit to one. Methods may include unlocking the details sub-portion and the approvals sub-portion and setting the approval bit to zero when an edit command is received.

20 Claims, 7 Drawing Sheets

ENABLER FOR EDITING A PREVIOUSLY RATIFIED TRANSMISSION

FIELD OF THE INVENTION

This invention relates to transmissions. Specifically, this invention relates to enabling editing in a previously-ratified or approved transmission.

BACKGROUND OF THE INVENTION

Previously, entities created transmissions. The transmission may be a transfer of information, a transfer of equipment, a transfer of goods, a transfer of funds or any other suitable transfer. Each transmission may require a ratification and/or approval from a single entity or a plurality of entities.

Once the transmission receives an approval from a first approver, the transmission would become locked—i.e., no person or entity was able to manipulate or change any portion of the transmission. The locking is a security feature that ensures that the transmission was not changed without the first approver's knowledge.

One problem with this conventional system is that, at times the transmission requires editing, deleting or changing after a first approval has been received. Therefore, a system where a transmission can be edited post-approval is necessary.

SUMMARY OF THE DISCLOSURE

A method for editing a previously approved transmission is provided. The method may include allocating a portion of memory on a first computer. The portion of memory may include a computer-readable packet designated for the transmission.

The allocating may include allocating a details sub-portion of the memory for transmission details. The allocating may also include allocating an approvals sub-portion for approval details.

The method may also include writing the transmission details into the details sub-portion of memory. The method may also include writing a plurality of approver identifications into the approvals sub-portion.

The method may also include transmitting the computer-readable packet to a plurality of electronic approver addresses. The plurality of electronic approver addresses may be email addresses. The plurality of electronic approver addresses may be included in the plurality of approver identifications.

The method may include enabling each approver to set an approval bit to one. This setting of an approval bit to one can be performed either directly—i.e., as a result of direct approver action—or indirectly, as an additional outcome of a user's approval. Each approver may be identified by the plurality of approver identifications. Each approval bit may be associated with each approver identification. Each approval bit may determine whether the associated approver approved the transmission.

The method may include transmitting a lockdown message to the first computer when an approver sets the approval bit to one. The lockdown message creates a lock on the details sub-portion. The lock may disable edit capabilities of both the details sub-portion and the approvals sub-portion.

The method may include performing a series of execution steps upon receipt of an edit command. The steps may include enabling the edit capabilities of the details sub-portion. The steps may also include setting each approval bit, associated with each approver, to zero.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

An apparatus for editing a previously approved transmission is provided. The apparatus may include a memory allocator. The memory allocator may be configured to allocate a portion of memory on a first computer. The portion of memory may include a computer-readable packet designated for the transmission.

The memory allocator may allocate a details sub-portion of the computer-readable packet for transmission details. The memory allocator may allocate an approvals sub-portion of the computer-readable packet for transmission approvals.

The apparatus may include a read/write head. The read/write head may be configured to write the transmission details into the details sub-portion. The read/write head may also be configured to write a plurality of approval identifications into the approvals sub-portion.

The apparatus may include a transmitter. The transmitter may be configured to transmit the computer-readable packet to a first approver email address. The first approver email address may be included in a plurality of approval email addresses. The plurality of approver email addresses may be associated with the plurality of approver identifications.

The apparatus may include a processor. The processor may be configured to enable a first approver to set a first approval bit to one. The first approver may be associated with a first approver email address. The first approver may be identified by the plurality of approver identifications. Setting the first approval bit to one may provide a determination that the first approver approved the transmission.

Upon the first approver setting the first approval bit to one, the transmitter may be further configured to execute a plurality of transmissions. The transmissions may include transmitting a lockdown message to the first computer. The lockdown message may create a lock on the details sub-portion. In certain embodiments, the lock may disable edit capabilities of both the details sub-portion and the approvals sub-portion.

In some embodiments, the lock may disable capabilities of either the details sub-portion or the approvals sub-portion.

The transmissions may also include transmitting the computer-readable packet to a second approver email address. The second approver email address may be included in the plurality of approver email addresses. The plurality of approver email addresses may be associated with the plurality of approver identifications.

The processor may also be configured to enable a second approver to set a second approval bit to one. The second approver may be associated with the second approval email address. The second approver may be identified by the plurality of approver identifications. Setting the second approval bit to one may provide a determination that the second approver approved the transmission.

The processor may also enable the second approver to set the second approval bit to zero. Setting the second bit to zero may provide a determination that the second approver denied the transmission.

In some embodiments, the second approver may be a senior approver. The senior approver may only wish to approve the transmission after the transmission received a junior approver's approval.

In some embodiments, the plurality of approvers may receive the computer-readable packet at substantially the same time. In these embodiments, upon each approver setting his or her respective approval bit, the computer-readable packet may communicate the approval information back to the first computer. In turn, the first computer, may communicate the updated approval information to the remaining plurality of approvers.

Upon receipt of an edit command, the processor may be configured to enable the edit capabilities of the details sub-portion and set the first approval bit and the second approval bit to zero.

The processor may reset the first approval bit to zero upon the second approver setting the second approval bit to zero.

The processor may be configured to save data in an audit log at the first computer. The data may include a date and time associated with the transmission of the computer-readable packet to the first approver email address. The data may also include a date and time associated with setting the first approval bit to one. The data may also include a date and time associated with the transmission of the computer-readable packet to the second approver email address. The data may include a date and time associated with setting the second approval bit to one. The data may also include a date and time associated with receipt of the edit command. The data may also include a location of a mobile device associated with the edit command at a time the edit command was generated and/or received. The data may also include an identity of a person to whom the mobile device is registered.

The processor may also be configured to place the computer-readable packet in a transmission completion queue when the first approval bit and the second approval bit are set to one.

The processor may also be configured to transmit the computer-readable packet from the transmission queue to a transmission destination.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
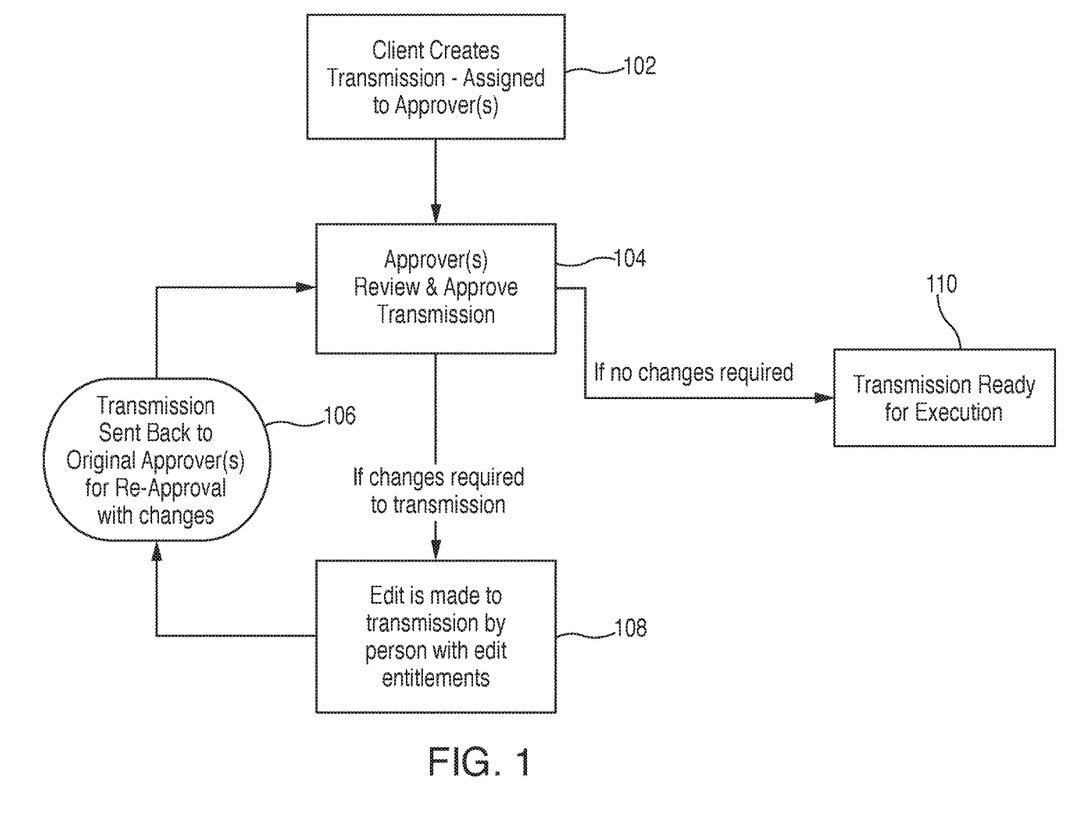
FIG. 1 shows an illustrative flow chart according to certain embodiments.

FIG. 1 shows a transmission flow chart. Step 102 shows a client creates a transmission and assigns the transmission to approver(s). Step 104 shows approver(s) review the transmission and approve the transmission. Step 108 shows, if changes are required to be made to the transmission, an edit is made to the transmission by a person with edit entitlements.

Step 106 shows the transmission is sent back to the original approver(s) for re-approval with changes. Step 110 shows that if no changes are required the transmission is ready for execution.

Figure 2:
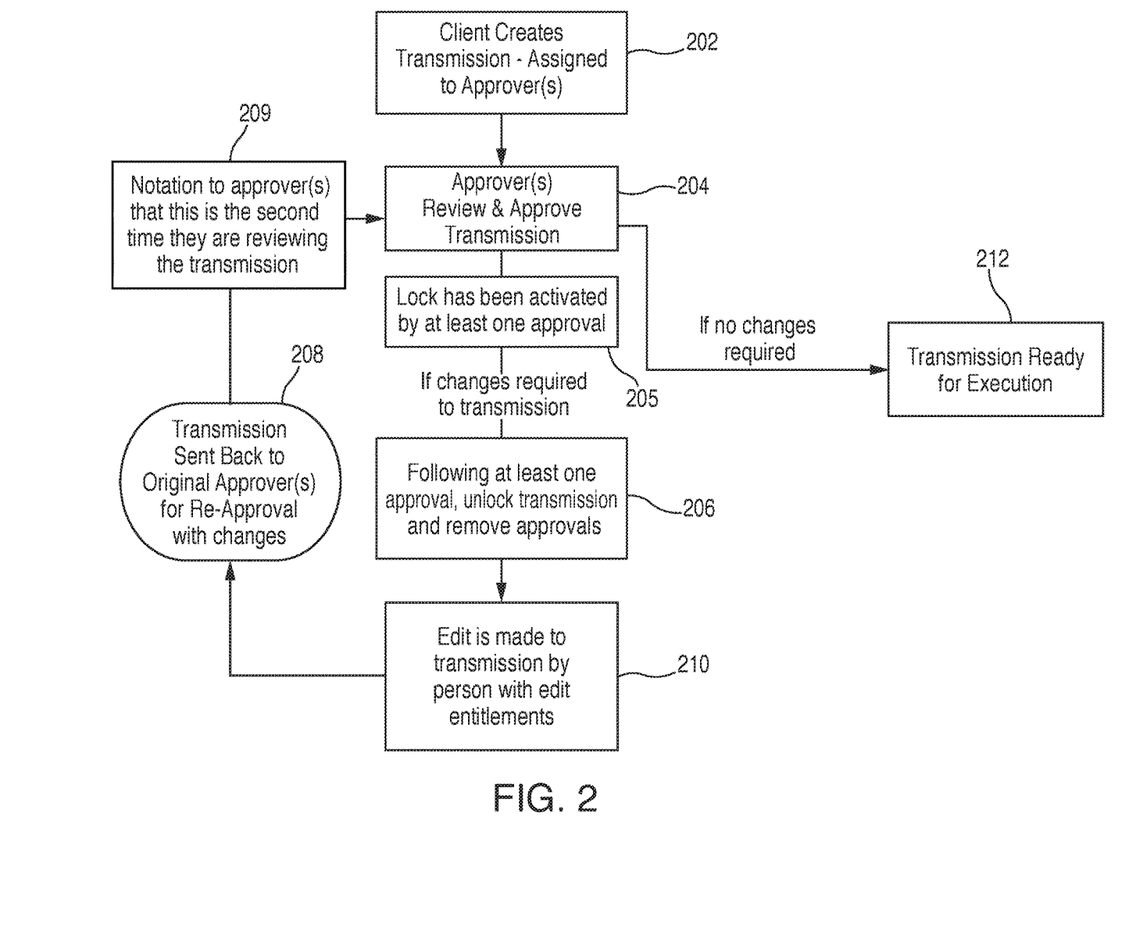
FIG. 2 shows another illustrative flow chart according to certain embodiments.

FIG. 2 shows another transmission flow chart with unlocking and edit capabilities. Step 202 shows a client creates a transmission and assigns approvers to the transmission. Step 204 shows approver(s) review and approve the transmission. Step 205 shows a lock of the edit capabilities, associated with a computer-readable packet that has been approved by a first approver. The lock may have been activated by at least one approval. Step 206 shows, if changes are required to transmission, following at least one approval, unlocking of the transmission and removing the approvals. Step 210 shows that edits may be made to the transmission by a person with edit entitlements. Step 208 shows the transmission being sent back to the original approver(s) for re-approval with changes. Step 209 shows, in addition to the transmission, a notation may be sent to the approver(s) that this is the second time the approver(s) are reviewing the transmission. Step 209 may direct the process back to step 204 where the approvers review the transmission and approve the transmission.

Step 212 shows, if no changes are required, the transmission is ready for execution.

Figure 3:
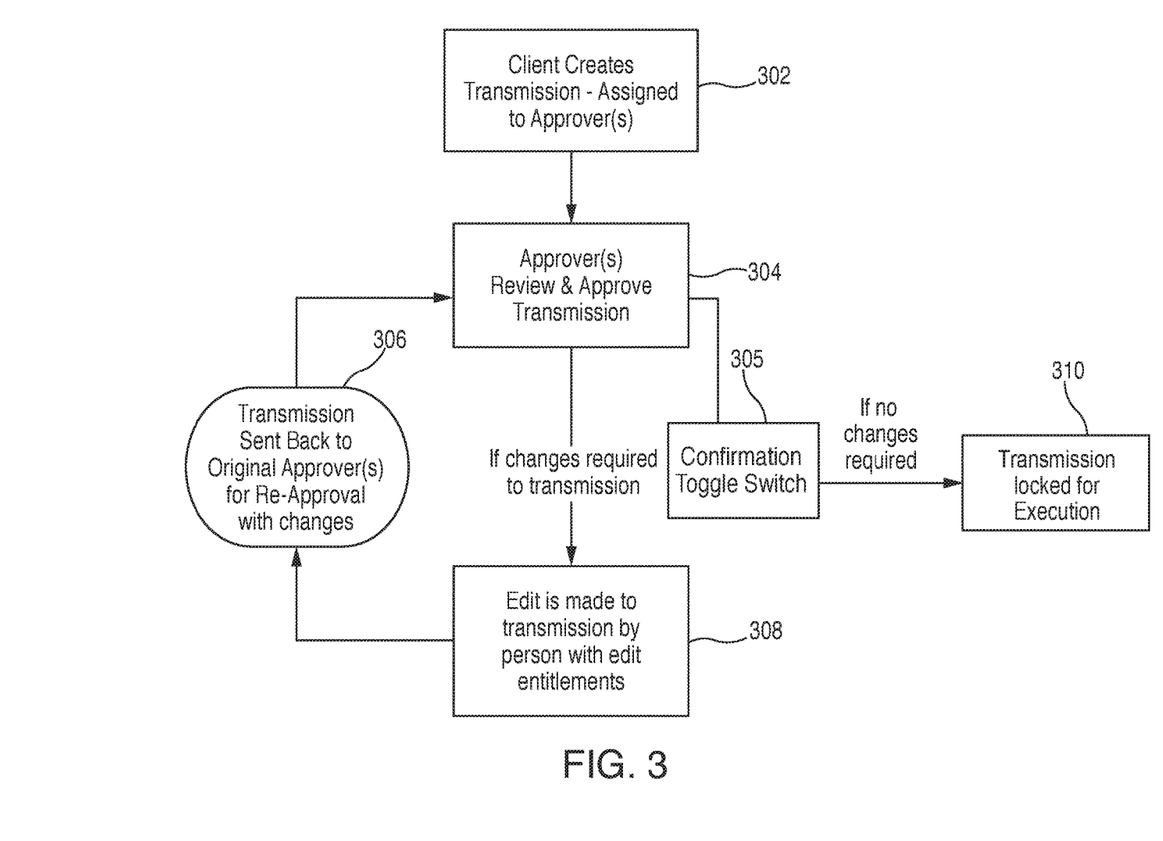
FIG. 3 shows yet another illustrative flow chart according to certain embodiments.

FIG. 3 shows another transmission locking flow chart. Step 302 shows a client creates a transmission and assigns the transmission to approver(s). Step 304 shows approver(s) review and approve the transmission. Step 308 shows, if changes are required to be made to the transmission, an edit may be made to the transmission by a person or entity with edit entitlements. Step 306 shows the transmission is sent back to the original approver(s) for re-approval with changes.

Step 305 shows a confirmation toggle switch. The confirmation toggle switch may enable a user to toggle between two sets of rules. If the confirmation switch is set to edit, edit capabilities of the transmission may be enabled albeit with the removal of the approvals. If the confirmation switch is set to no edits, edit capabilities of the transmission may be disabled even with the removal of the approvals. Step 310 shows, that if no changes are required, the transmission may be locked for execution.

Figure 4:
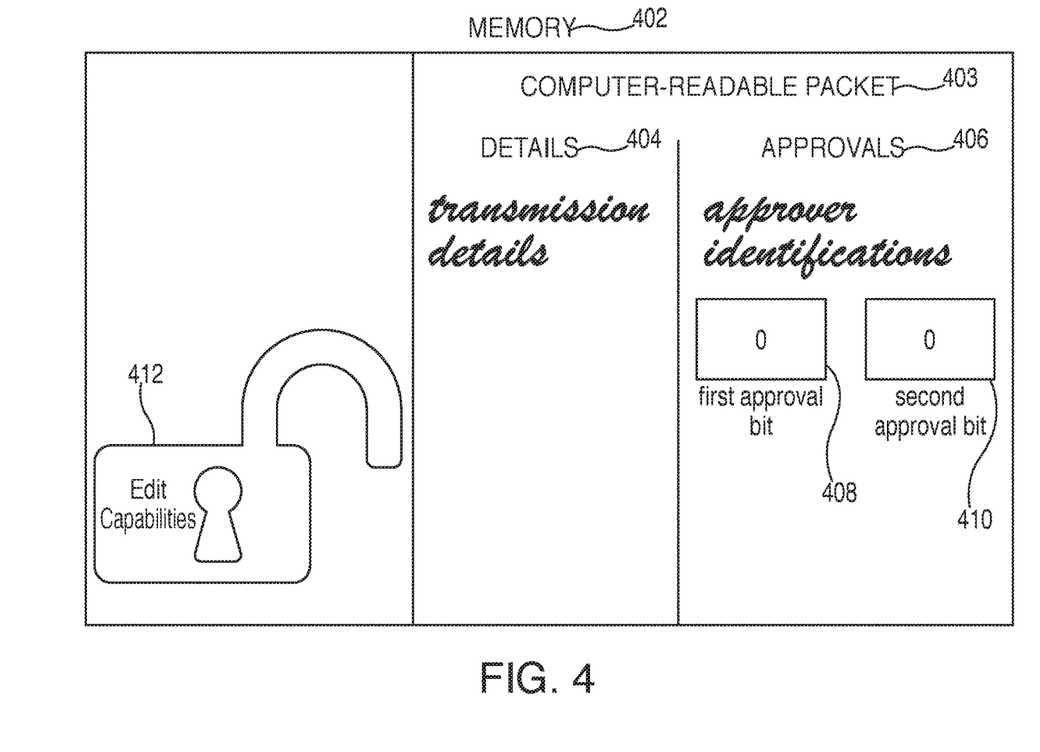
FIG. 4 shows an illustrative memory component according to certain embodiments.

FIG. 4 shows memory 402. Memory 402 may include computer-readable packet 403. Computer-readable packet 403 may include details portion 404 and approvals portion 406. Details portion 404 may include transmission details. The transmission details may include transmission sender, transmission receiver, an IP address associated with the transmission sender, an IP address associated with the transmission receiver and any other suitable transmission information.

Approvals portion 406 may include approver identifications. The approver identifications may include names, or other identifiers, of approvers as well as contact information associated with each approver. The contact information may include an email address, a postal address, a landline phone number, a cellular phone number and/or any other suitable contact information.

FIG. 4 may show first approval bit 408 as set to zero. In the embodiment shown in FIG. 4, a first approver may not have approved the transmission. Therefore, first approval bit 408 may be set to zero.

FIG. 4 may show second approval bit 410 as set to zero. In the embodiment shown in FIG. 4, a second approver may not yet have approved the transmission. Therefore, second approval bit 410 may be set to zero.

Because both first approval bit 408 and second approval bit 410 may be set to zero, the edit capabilities of computer-readable packet 403 may be unlocked, as shown at symbol 412. The edit capabilities may enable editing of both details portion 404 and approvals portion 406.

Figure 5:
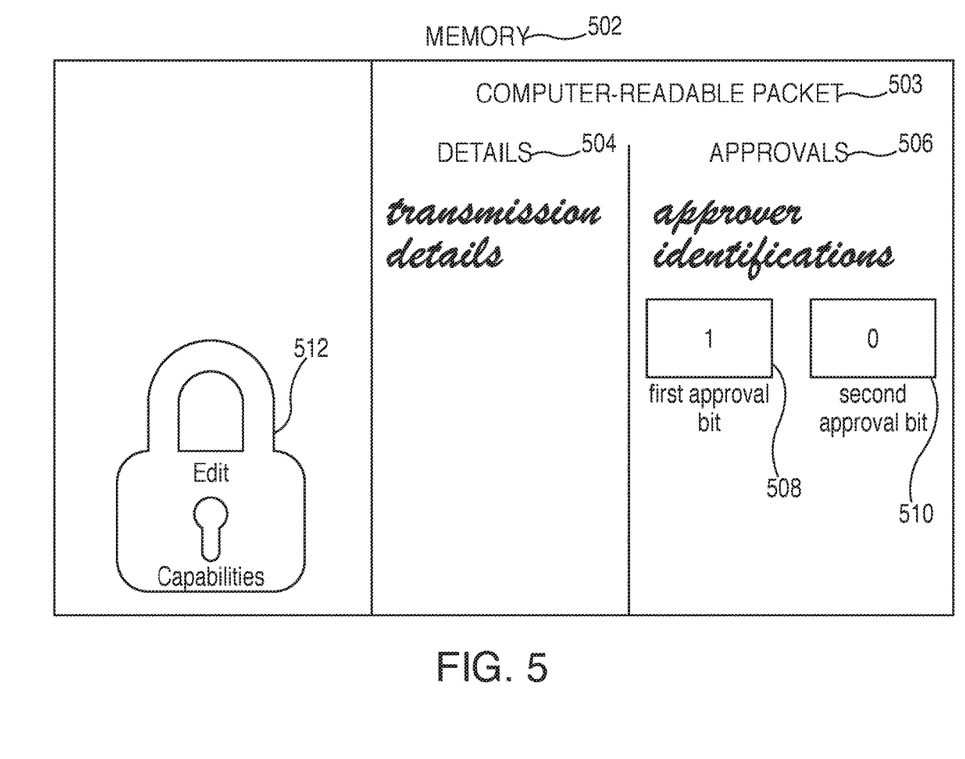
FIG. 5 shows another illustrative memory component according to certain embodiments.

FIG. 5 shows computer-readable packet 503 resident on memory 502. Memory 502 may be resident on the first approver's computer. Computer-readable packet 503 may include details portion 504 and approvals portion 506. The first approver may have set first approval bit 508 to one to indicate the first approver's approval of the transmission.

Because first approval bit 508 is set to one, edit capabilities 512 may be locked. Because edit capabilities 512 may be locked, a user may be unable to edit either details portion 504 or approvals portion 506 of computer-readable packet 503.

Computer-readable packet 503 may be transmitted to a second approver. The second approver may review details portion 504 of computer-readable packet 503. If the second approver approves the transmission, second approval bit 510 may be set to one.

Figure 6:
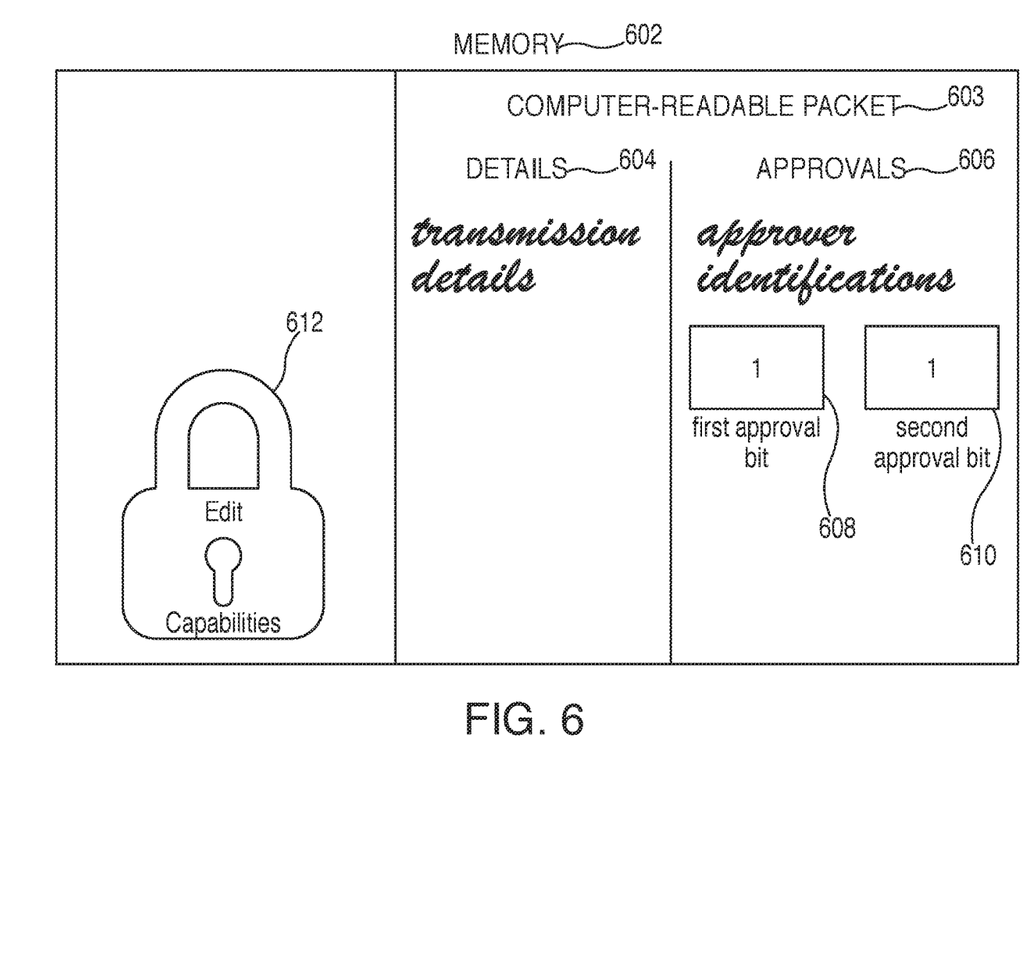
FIG. 6 shows yet another illustrative memory component according to certain embodiments.

FIG. 6 shows memory 602. Computer-readable packet 603 may be resident on memory 602. Computer-readable packet 603 may include details portion 604 and approvals portion 606. Details portion 604 may include transmission details. Transmission details may include date and time of the transmission, text associated with the transmission, size of the transmission, transmission metadata and/or any other suitable transmission details. Approvals portion 606 may include approver identifications. Approver identifications may include approver names and identification information associated with each approver. Examples of identification information may be approver social security number, approver taxpayer identification number, approver employee identification number, approver address, approver home phone number, approver cellular phone number, approver office phone number, or any other suitable approver identification information.

Approvals portion 606 may include first approval bit 608. First approval bit 608 may be set to one. This may be because a first approver approved the transmission. A second approver may also have approved the transmission. Following approval by the second approver, second approval bit 610 may be set to one. Although only two approval bits, corresponding to two distinct approvers are shown in FIG. 6, in some embodiments, there may more than two approvers or less than two approvers. Hence there may be more than two approval bits or less than two approval bits. Also, approval bits may be turned on only in response to a group of approvers acting together. Because a minimum of one approval was received, edit capabilities 612 may be locked.

In some embodiments, if the second approver sets second approval bit 610 to zero, first approval bit 608 may be set to zero as well. When both approval bits are set to zero, the edit capabilities may become unlocked. Therefore, if a senior approver denies a transmission, the transmission may be edited and then re-require approvals.

Figure 7:
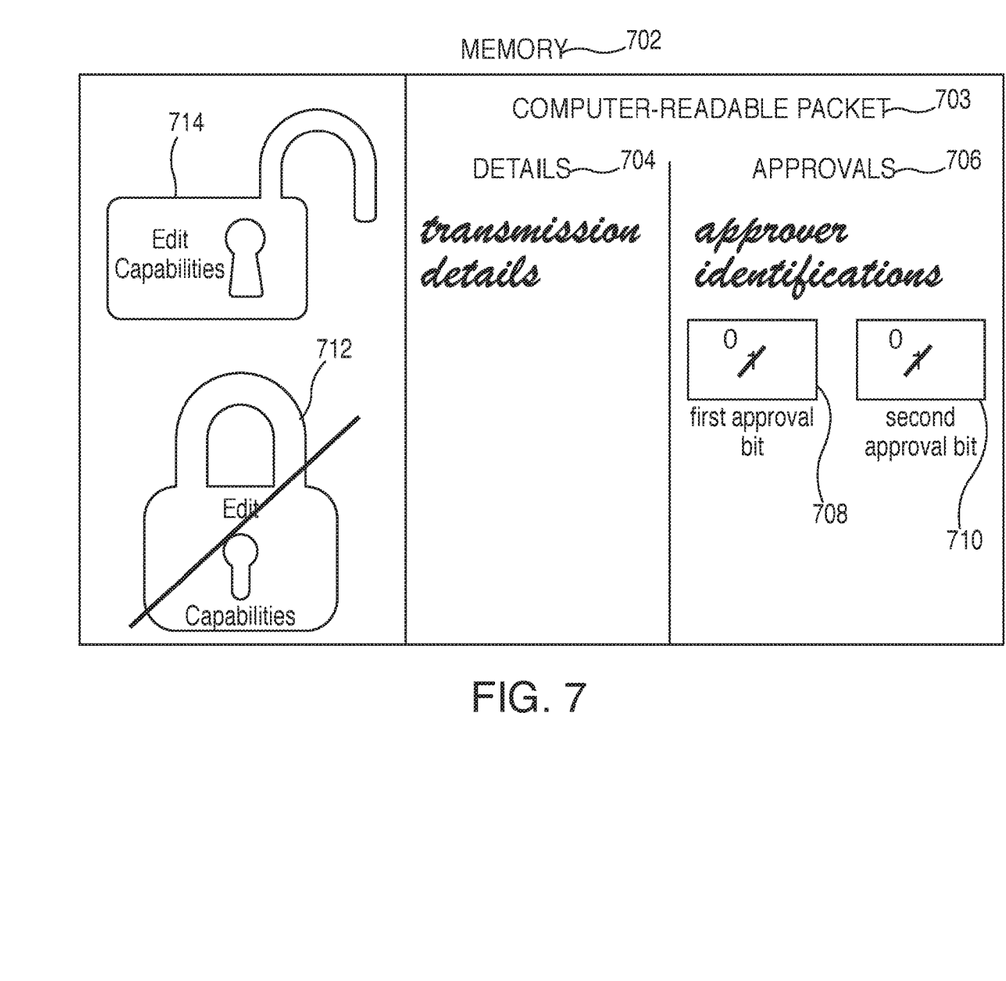
FIG. 7 shows still another illustrative memory component according to certain embodiments.

FIG. 7 shows memory 702. Memory 702 may include computer-readable packet 703. Computer-readable packet 703 may include details portion 704. Details portion 704 may include transmission details.

Computer-readable packet 703 may also include approvals portion 706. Approvals portion 706 may include approver identifications. Approvals portion 706 may include an approval bit associated with each approver identification. Approvals portion 706 may include first approval bit 708 and second approval bit 710. First approval bit 708 may be associated with a first approver. Second approval bit 710 may be associated with a second approver.

Previously, first approval bit 708 was set to one because the first approver approved the transmission. Second approval bit 710 was also set to one because the second approver approved the transmission.

Edit capabilities 712 may have been locked because first approval bit 708 was set to one.

Computer-readable packet 703 may have received an edit command. Because computer-readable packet 703 received an edit command, edit capabilities may have become unlocked, as shown at 714 and first approval bit 708 and second approval bit 710 may be reset to zero. Resetting first approval bit 708 and second approval bit 710 to zero may ensure that any edits executed on computer-readable packet 703 may be approved prior to transmission.

Thus, methods and apparatus for an enabler for editing a previously approved transmission is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for editing a previously approved transmission, the method comprising:
   allocating a portion of memory on a first computer, the portion of memory comprising a computer-readable packet designated for the transmission, the allocating comprising:
   allocating a details portion for transmission details; and allocating an approvals portion for transmission approvals;

writing the transmission details into the details portion;

writing a plurality of approver identifications into the approvals portion;

transmitting the computer-readable packet to a plurality of approver email addresses included in the plurality of approver identifications;

enabling each approver, identified by the plurality of approver identifications, to set an approval bit, associated with each approver identification, to one, each approval bit determining whether the associated approver approved the transmission;

when an approver, sets the approval bit to one, transmitting a lockdown message to the first computer, the lockdown message creating a lock on the details portion, the lock disabling edit capabilities of both the details portion and the approvals portion;

upon receipt of a command to edit the details portion and the approvals portion:
 enabling the edit capabilities of the details portion and the approvals portion; and
 setting each approval bit, associated with each approver, to zero.

2. The method of claim 1, further comprising saving in an audit log at the first computer:
 a date and time associated with the transmitting;
 a date and time associated with each setting of the approval hit to one; and
 a date and time associated with receipt of the edit command;
 a location of a mobile device associated with the edit command at a time the edit command was received; and
 an identity of a person to whom the mobile device is registered at the time the edit command was received.

3. The method of claim 2, further comprising, placing the transmission in a transmission completion queue when each approval bit is set to one.

4. The method of claim 3, further comprising, transmitting the transmission from the transmission completion queue to a transmission destination upon receipt of a transmission command from a user.

5. The method of claim 4, wherein the transmission destination is embedded in the computer-readable packet.

6. A method for editing a previously approved transmission, the method comprising:
 allocating a portion of memory on a first computer, the portion of memory comprising a computer-readable packet designated for the transmission, the allocating comprising:
  allocating a details portion for transmission details; and
  allocating an approvals portion for transmission approvals;
 writing the transmission details into the details portion;
 writing a plurality of approver identifications into the approvals portion;
 transmitting the computer-readable packet to a first approver included in a plurality of approvers;
 enabling the first approver to set a first approval bit, associated with the first approver's approver identification, to one, said first approval bit determining whether the first approver approved the transmission;
 when the first approver sets the first approval bit to one, transmitting a lockdown message to the first computer, the lockdown message creating a lock on the details portion, the lock disabling edit capabilities of both the details portion and the approvals portion;
 transmitting the computer-readable packet to a subsequent approver;
 when a subsequent approver sets a subsequent approval bit to zero, setting the first approval bit to zero;
 when each approval bit is set to zero, the edit capabilities of the both the details portion and the approvals portion are enabled;
 upon receipt of a command to edit the details portion and the approvals portion:
  enabling the edit capabilities of the details portion and the approvals portion; and
  setting each approval bit, associated with each approver included in the plurality of approvers, to zero.

7. The method of claim 4, further comprising saving in an audit log at the first computer:
 a date and time associated with the transmitting;
 a date and time associated with setting the first approval bit to one; and
 a date and time associated with receipt of the edit command;
 a location of a mobile device which transmitted the edit command and a time that the edit command was received; and
 an identity of the person to whom the mobile device is registered at the time the edit command was received.

8. The method of claim 7, further comprising, placing the transmission in a transmission completion queue when each approval bit is set to one.

9. The method of claim 8, wherein the transmission destination is embedded in the computer-readable packet.

10. A method for editing a previously approved transmission, the method comprising:
 allocating a portion of memory on a first computer, the portion of memory comprising a computer-readable packet designated for the transmission, said allocating comprising:
  allocating a details portion for transmission details; and
  allocating an approvals portion for transmission approvals;
 writing the transmission details into the details portion;
 writing a plurality of approver identifications into the approvals portion;
 transmitting the computer-readable packet to a first approver electronic address included in a plurality of approver email addresses associated with the plurality of approver identifications;
 enabling a first approver, associated with the first approver email address, identified by one of the plurality of approver identifications, to set a first approval bit to one, the setting the first approval bit to one indicating that the first approver approved the transmission;
 upon the first approver setting the first approval bit to one:
  transmitting a lockdown message to the first computer, the lockdown message creating a lock on the details portion, said lock disabling edit capabilities of both the details portion and the approvals portion;
  transmitting the computer-readable packet to a second approver email address included in the plurality of approver email addresses associated with the plurality of approver identifications;
  enabling the second approver to set a second approval bit, associated with the second approver's approver identification, to one, said setting the second approval bit to one determining that the second approver approved the transmission;

enabling the second approver to set the second approval bit to zero, said setting the second approval bit to zero determining that the second approver denied the transmission;

upon receipt of a command to edit the details portion and the approvals portion:

enabling the edit capabilities of the details portion and the approvals portion; and setting the first approval bit and the second approval bit to zero.

11. The method of claim 10, further comprising setting the first approval bit to zero upon the second approver setting the approval hit to zero.

12. The method of claim 10, further comprising saving in an audit log at the first computer:

a date and time associated with the transmitting;

a date and time associated with setting the first approval hit to one;

a date and time associated with setting the second approval bit to one;

a date and time associated with receipt of an edit command;

a location of a mobile device associated with the edit command at a time the edit command was received; and an identity of the person to whom the mobile device is registered at the time the edit command was received.

13. The method of claim 12, wherein when the first approval bit and the second approval bit are set to one, placing the transmission in a transmission completion queue.

14. The method of claim 13, further comprising transmitting the transmission from the transmission completion queue to a transmission destination upon receipt of a transmit command from a user.

15. The method of claim 14, wherein the transmission destination is embedded in the computer-readable packet.

16. An apparatus for editing a previously approved transmission, the apparatus comprising:

a memory allocator configured to allocate a portion of memory on a first computer, the portion of memory comprising a computer-readable packet designated for the transmission, the memory allocator allocating:

a details portion of the computer-readable packet for transmission details; and an approvals portion of the computer-readable packet for transmission approvals;

a read/write head configured to:

write the transmission details into the details portion; and write a plurality of approval identifications into the approvals portion;

a transmitter configured to:

transmit the computer-readable packet to a first approver email address included in a plurality of approver email addresses associated with the plurality of approver identifications;

a processor configured to:

enable a first approver, associated with the first approver email address, identified by the plurality of approver identifications, to set a first approval bit to one, the setting the first approval bit to one providing a determination that the first approver approved the transmission;

upon the first approver setting the first approval bit to one:

the transmitter further configured to:

transmit a lockdown message to the first computer, the lockdown message creating a lock on the details portion, the lock disabling edit capabilities of both the details portion and the approvals portion;

transmit the computer-readable packet to a second approver email address included in the plurality of approver email addresses associated with the plurality of approver identifications;

the processor further configured to:

enable a second approver, associated with the second approver email address, identified by the plurality of approver identifications, to set a second approval bit to one, the setting the second approval bit to one providing a determination that the second approver approved the transmission;

enable the second approver to set the second approval bit to zero, the setting the second approval bit to zero providing a determination that the second approver denied the transmission;

upon receipt of a command to edit the details portion and the approvals portion:

enable the edit capabilities of the details portion; and set the first approval bit and the second approval bit to zero.

17. The apparatus of claim 16, wherein the processor sets the first approval bit to zero upon the second approver setting the second approval bit to zero.

18. The apparatus of claim 16, wherein the processor is configured to save in an audit log at the first computer:

a date and time associated with the transmission of the computer-readably: packet to the first approver email address;

a date and time associated with setting the first approval bit to one;

a date and time associated with the transmission of the computer-readable packet to the second approver email address;

a date and time associated with setting the second approval hit to one;

a date and time associated with receipt of the edit command;

a location of a mobile device associated with the edit command at a time the edit command was received; and an identity of a person to whom the mobile device is registered.

19. The apparatus of claim 18, wherein the processor is further configured to place the computer-readable packet in a transmission completion queue when the first approval bit and the second approval bit are set to one.

20. The apparatus of claim 19, wherein the processor is further configured to transmit the computer-readable packet from the transmission completion queue to a transmission destination.

* * * * *